March 6, 1934.        R. L. ELLIS        1,949,829
GAS METER HANGER
Filed Oct. 31, 1930
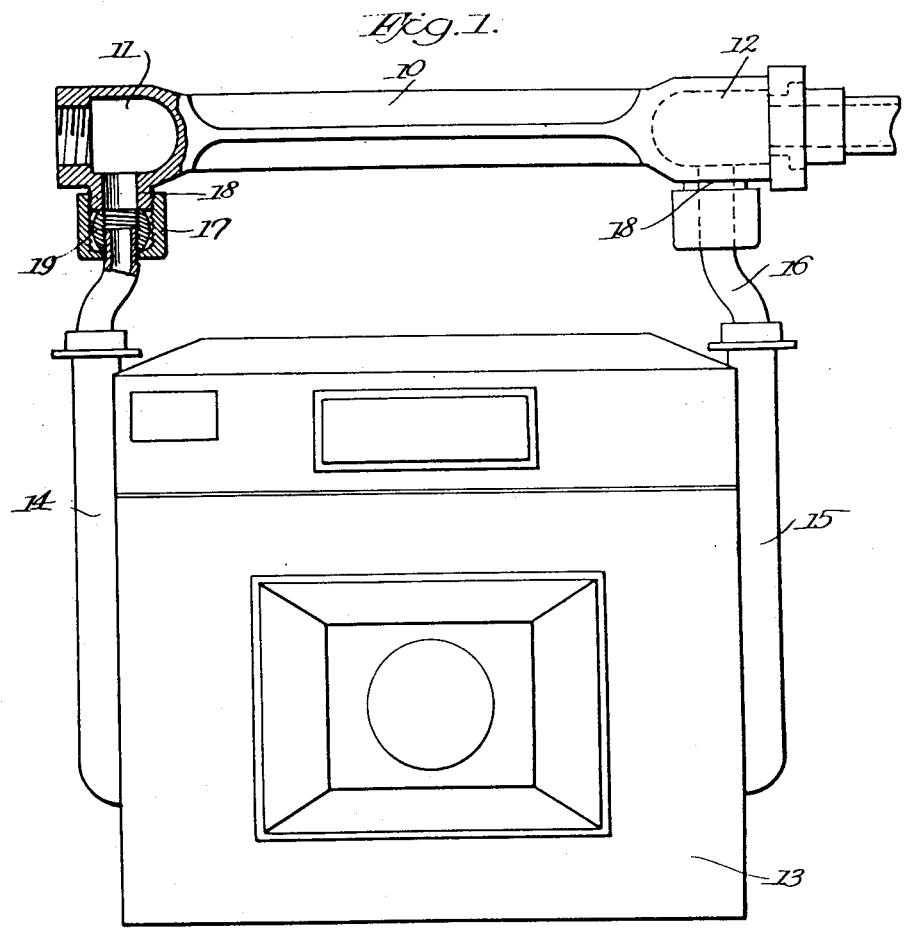
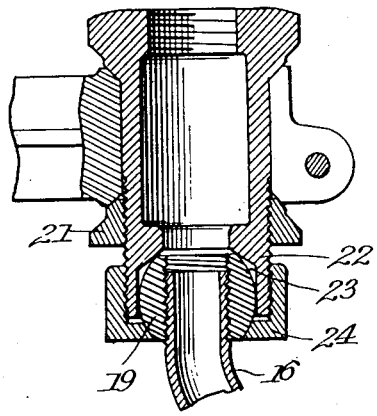
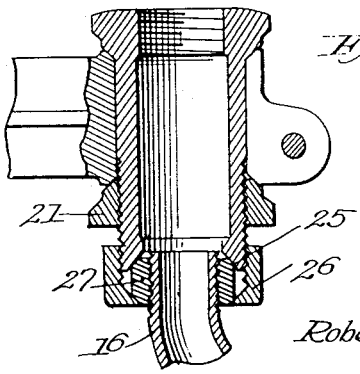
Inventor
Robert L. Ellis
By Cushman Bryant Darby
Attorney Patented Mar. 6, 1934

1,949,829

UNITED STATES PATENT OFFICE 1,949,829

GAS METER HANGER

Robert L. Ellis, Miami Beach, Fla., assignor to Mueller Co., Decatur, Ill., a corporation of Illinois Application October 31, 1930, Serial No. 492,590

1 Claim. (Cl. 285—3)

The present invention relates to meter hangers and more particularly to an improved connection between the hanger and the meter.

Heretofore, connections between the meter hanger and the meter have been characterized by the use of nipples which, for some purposes, have the desired flexibility, but, in many instances, are found to be totally inadequate. This difficulty is principally due to the fact that the inlet and outlet tubes of the meter are not exactly parallel and it often happens that the nipple connections which are secured to the hanger are likewise out of parallel due to some defect in the hanger, with the result that the connections are strained, causing an imperfect seal and breakage.

In order to overcome such undesirable conditions, I have provided a hanger having connections for the meter wherein, regardless of the alignment of the inlet and outlet ports of the meter or the hanger, a connection can be established without in any way straining the meter tubes or the connections.

In carrying out the invention, nipples are provided, but such nipples have a universal connection with the meter hanger and such connection is established without the necessity of machining the meter connection or resorting to any expensive means.

The nipple connections are ordinarily of some flexible tubing such as lead and it is proposed to secure to such connections a yieldable and compressible member of rubber or malleable metal which will have universal movement with respect to the hanger and the meter.

Referring to the drawing,

Figure 1 is a view showing my hanger with one form of connection illustrated in section.

Figure 2 is a sectional view showing a further form, and

Figure 3 is a sectional view showing another form.

The hanger is indicated at 10 and is preferably formed of cast iron having an inlet 11 at one end and an outlet 12 at the other. The service pipes are connected at the inlet and outlet ends in any suitable manner.

The meter is indicated at 13 and the meter tubes at 14 and 15. The usual nipples 16 of some flexible material are employed and are secured to the meter hanger after the manner of this invention.

In Figure 1, a coupling nut 17 is employed which engages the threaded hollow depending pipe or projection 18 of the hanger. The nut 17 and the projection 18 form a housing or enclosure for a substantially ball shaped member 19. This ball shaped member is preferably of yieldable material such as rubber, but any equivalent resilient or compressible substance or composition can be utilized. There are a large number of commercial substitutes for rubber having the desired degree of flexibility and compressibility. The ball shaped member 19, as shown, is secured in any suitable manner to the flexible nipple member 16, the ball shaped member being of relatively hard rubber which will allow the nipple member 16 to have screw threaded engagement therewith. Since the ball is compressed by the nut 17, there is no chance of tearing the threads, in either a rubber or malleable metal ball.

By reason of this construction, notwithstanding that the meter tubes 14 and 15 be out of parallel alignment or the projections 18 of the hanger be out of true, nevertheless because of the flexible nipple 16 and the universal connection provided by the ball member 19, there can be no tendency of the parts to strain such as would result in an imperfect connection or breakage.

It will be noted with the construction shown in Figure 1, that there is no need to machine the parts and that the lead or rubber ball member will be satisfactorily housed and compressed between the nut 17 and the projection 18 without any change in these parts.

In Figure 2, the hanger is provided with a separate tubular connection or pipe 20 at each end which is maintained securely in position by means of the nut 21 having threaded engagement with the connection 20 and having a beveled portion engaging a similar beveled portion on the hanger. The connection 20 has an extended portion 22 provided with a recess 23 and this extended portion is externally threaded to receive the nut 24. The ball 19 is confined in the recess 23 and is engaged by the nut 24 at the bottom to form a tight seal. In this manner, the use of a yieldable and compressible universal member is provided for in meter hangers employing the separate connections 20. As with previous constructions, there is no need to machine the parts to receive the rubber or lead ball 19 and as will be noted in connection with both the construction shown in Figures 1 and 2, an adequate seal will be provided at all times.

In the construction shown in Figure 3, the connection or pipe 20 has a beveled surface 25 and is threaded exteriorly to receive the nut 26. Confined between the beveled surface 25 and the nut is a flexible member preferably of rubber, lead or some yieldable material 27 which is in the form of a thickened washer, but which will permit of the necessary universal movement of the nipple connections 16 and establish the required seal.

It will be understood that the yieldable member by which the universal connection is provided may take various forms and the illustration of a spherical member or one which is in the form of a thickened washer are only a few of the examples of embodiments of the invention. For instance, the member 27 may take the form of a thickened ring having beveled edges. Such a construction is not, however, necessary, since the compressibility of the member 27 will permit of the required universal movement and, moreover, enable a satisfactory seal to be at all times established.

It will be understood that the yieldable character of the universal member is not such as to impart or create a strain sufficient to affect the meter tubes should for any reason there occur a binding of the ball or universal member within its housing. The compressibility and flexibility of the universal member is, however, such as to take care of any inaccuracies in either the construction of the meter or of the hanger to provide an adequate seal and eliminate the strain incident to the use of present structures. At the same time no change is necessary in either the meter or the hanger in order to apply the present invention.

It will be understood that the members 16 need not be of flexible material, in view of the provision of the flexible, compressible and universally mounted members 19 and 27. In other words, the nipple members 16 can be of relatively rigid material and properly bent, so that there will be no need to further bend them when the meter is being connected.

Moreover, the connections 16 and the universal members may be made integral and formed of similar compressible and flexible material. That is to say, suitable rubber or lead nipple members may be provided, having enlarged ends corresponding to the ball shaped or washer shaped universal members illustrated in the drawing.

The universal connection can be employed at the joint between the tubes 14 and 15 and the nipple members 16, as well as at the joint between the nipple members and the hanger, as will be readily understood. Furthermore, it may be found in some cases desirable to employ two universal connections one at the point where the nipple is connected to the meter tubes and the other at the point where the nipple members are connected to the hanger.

The invention is capable of various embodiments and modifications, all of which are comprehended within the scope of the claim.

I claim:

A meter hanger, a pipe leading from said hanger for connection with the end of a meter nipple to establish communication with a meter, means for connecting the pipe to the nipple comprising a compressible ball-shaped sealing member having an opening therethrough carried by and surrounding the end of the nipple and adjustable thereon, and a nut adjustable on the pipe receiving the nipple and confining the compressible member to compress the same around the nipple and against the pipe to provide a gas-tight joint, said nut having its contact surface with said ball-shaped member formed to permit movement of the ball-shaped member with respect thereto, whereby a ball and socket movement is permitted said nipple with respect to said hanger and said hanger pipe.

ROBERT L. ELLIS.